(12) United States Patent
Virkkala et al.

(10) Patent No.: US 11,838,990 B2
(45) Date of Patent: Dec. 5, 2023

(54) COMMUNICATING SENSOR DATA IN WIRELESS COMMUNICATION SYSTEMS

(71) Applicant: Amer Sports Digital Services Oy, Vantaa (FI)

(72) Inventors: Jussi Virkkala, Vantaa (FI); Timo Eriksson, Vantaa (FI); Erik Lindman, Vantaa (FI); Tuomas Hapola, Vantaa (FI); Mikko Martikka, Vantaa (FI); Heikki Nieminen, Vantaa (FI)

(73) Assignee: Suunto Oy, Vantaa (FI)

( * ) Notice: Subject to any disclaimer, the term of this patent is extended or adjusted under 35 U.S.C. 154(b) by 566 days.

(21) Appl. No.: 16/228,887

(22) Filed: Dec. 21, 2018

(65) Prior Publication Data

US 2019/0116632 A1 Apr. 18, 2019

Related U.S. Application Data

(63) Continuation-in-part of application No. 15/382,763, filed on Dec. 19, 2016, now Pat. No. 11,607,144, and
(Continued)

(30) Foreign Application Priority Data

Dec. 21, 2015 (FI) ...................................... 20155989
Dec. 21, 2015 (GB) ...................................... 1522525
(Continued)

(51) Int. Cl.
*H04W 84/18* (2009.01)
*H04W 4/38* (2018.01)
(Continued)

(52) U.S. Cl.
CPC ............. *H04W 84/18* (2013.01); *H04L 67/12* (2013.01); *H04L 67/535* (2022.05); *H04W 4/38* (2018.02)

(58) Field of Classification Search
CPC ........ H04W 84/18; H04W 4/38; H04L 67/12; H04L 67/22
(Continued)

(56) References Cited

U.S. PATENT DOCUMENTS 5,457,284 A 10/1995 Ferguson
5,503,145 A 4/1996 Clough
(Continued)

FOREIGN PATENT DOCUMENTS

AU 2007216704 A1 4/2008
CN 1877340 A1 12/2006
(Continued)

OTHER PUBLICATIONS

Sheta, Packet scheduling in LTE mobile network (Year: 2013).*
(Continued)

*Primary Examiner* — John E Breene
*Assistant Examiner* — Dacthang P Ngo
(74) *Attorney, Agent, or Firm* — Laine IP Oy (57) ABSTRACT

According to an example aspect, there is provided a method comprising a non-cellular receiver configured to receive first sensor data from a first wireless sensor node and second sensor data from the first or a second wireless sensor node, a processor configured to determine whether the second sensor data is a duplicate of the first sensor data and a cellular transmitter configured to transmit, responsive to the determination, third sensor data to a server, wherein said third sensor data is based on at least one of said first and second sensor data.

20 Claims, 5 Drawing Sheets

Related U.S. Application Data a continuation-in-part of application No. 15/386,050, filed on Dec. 21, 2016, now Pat. No. 10,856,776, and a continuation-in-part of application No. 15/386,062, filed on Dec. 21, 2016, now Pat. No. 10,433,768, and a continuation-in-part of application No. 15/386,074, filed on Dec. 21, 2016, now Pat. No. 10,327,673.

(30) Foreign Application Priority Data

| Sep. 20, 2016 | (FI) | ..................................... | 20165707 |
| Sep. 20, 2016 | (FI) | ..................................... | 20165709 |
| Sep. 20, 2016 | (FI) | ..................................... | 20165710 |

(51) Int. Cl.
*H04L 67/12* (2022.01)
*H04L 67/50* (2022.01)

(58) Field of Classification Search
USPC ......................................................... 702/160
See application file for complete search history.

(56) References Cited

U.S. PATENT DOCUMENTS

| 5,617,848 | A | 4/1997 | Cochran |
| 5,899,204 | A | 5/1999 | Cochran |
| 5,924,980 | A | 7/1999 | Coetzee |
| 6,882,955 | B1 | 4/2005 | Ohlenbusch et al. |
| 7,627,423 | B2 | 12/2009 | Brooks |
| 7,706,973 | B2 | 4/2010 | McBride et al. |
| 7,721,118 | B1 | 5/2010 | Tamasi et al. |
| 7,917,198 | B2 | 3/2011 | Ahola et al. |
| 7,938,752 | B1 | 5/2011 | Wang |
| 8,052,580 | B2 | 11/2011 | Saalasti et al. |
| 8,323,188 | B2 | 12/2012 | Tran |
| 8,328,718 | B2 | 12/2012 | Tran |
| 8,538,693 | B2 | 9/2013 | McBride et al. |
| 8,612,142 | B2 | 12/2013 | Zhang |
| 8,655,591 | B2 | 2/2014 | Van Hende |
| 8,781,730 | B2 | 7/2014 | Downey et al. |
| 8,848,058 | B2 | 9/2014 | Ayer et al. |
| 8,949,022 | B1 | 2/2015 | Fahrner et al. |
| 9,008,967 | B2 | 4/2015 | McBride et al. |
| 9,032,321 | B1 | 5/2015 | Cohen et al. |
| 9,079,090 | B2 | 7/2015 | Hohteri |
| 9,107,586 | B2 | 8/2015 | Tran |
| 9,222,787 | B2 | 12/2015 | Blumenberg et al. |
| 9,317,660 | B2 | 4/2016 | Burich et al. |
| 9,595,187 | B2 | 3/2017 | Kotz et al. |
| 9,648,108 | B2 | 5/2017 | Granqvist et al. |
| 9,665,873 | B2 | 5/2017 | Ackland et al. |
| 9,829,331 | B2 | 11/2017 | McBride et al. |
| 9,830,516 | B1 | 11/2017 | Biswas et al. |
| 9,907,473 | B2 | 3/2018 | Tran |
| 9,923,973 | B2 | 3/2018 | Granqvist et al. |
| 10,135,905 | B2 | 11/2018 | Chaudhri et al. |
| 10,234,290 | B2 | 3/2019 | Lush et al. |
| 10,244,948 | B2 | 4/2019 | Pham et al. |
| 10,295,556 | B1* | 5/2019 | Paczkowski ..... G01N 35/00871 |
| 10,327,673 | B2 | 6/2019 | Eriksson et al. |
| 10,415,990 | B2 | 9/2019 | Cho et al. |
| 10,433,768 | B2 | 10/2019 | Eriksson et al. |
| 10,515,990 | B2 | 12/2019 | Hung et al. |
| 10,634,511 | B2 | 4/2020 | McBride et al. |
| 10,816,671 | B2 | 10/2020 | Graham et al. |
| 2003/0038831 | A1 | 2/2003 | Engelfriet |
| 2003/0109287 | A1 | 6/2003 | Villaret |
| 2005/0070809 | A1 | 3/2005 | Acres |
| 2005/0086405 | A1 | 4/2005 | Kobayashi et al. |
| 2006/0068812 | A1 | 3/2006 | Carro et al. |
| 2006/0136173 | A1 | 6/2006 | Case, Jr. et al. |
| 2006/0255963 | A1 | 11/2006 | Thompson et al. |
| 2007/0156335 | A1 | 7/2007 | McBride et al. |
| 2007/0208544 | A1 | 9/2007 | Kulach et al. |
| 2007/0276200 | A1 | 11/2007 | Ahola et al. |
| 2008/0052493 | A1 | 2/2008 | Chang |
| 2008/0109158 | A1 | 5/2008 | Huhtala et al. |
| 2008/0136620 | A1* | 6/2008 | Lee ........................ G01D 21/00 340/531 |
| 2008/0158117 | A1 | 7/2008 | Wong et al. |
| 2008/0214360 | A1 | 9/2008 | Stirling et al. |
| 2008/0294663 | A1 | 11/2008 | Heinley et al. |
| 2008/0318598 | A1 | 12/2008 | Fry |
| 2009/0047645 | A1 | 2/2009 | Dibenedetto et al. |
| 2009/0048070 | A1 | 2/2009 | Vincent et al. |
| 2009/0094557 | A1 | 4/2009 | Howard |
| 2009/0100332 | A1 | 4/2009 | Kanjilal et al. |
| 2009/0265623 | A1 | 10/2009 | Kho et al. |
| 2010/0099539 | A1 | 4/2010 | Haataja |
| 2010/0167712 | A1 | 7/2010 | Stallings et al. |
| 2010/0187074 | A1 | 7/2010 | Manni |
| 2010/0257014 | A1 | 10/2010 | Roberts et al. |
| 2010/0313042 | A1 | 12/2010 | Shuster |
| 2011/0010704 | A1 | 1/2011 | Jeon et al. |
| 2011/0152695 | A1 | 6/2011 | Granqvist et al. |
| 2011/0218385 | A1 | 9/2011 | Bolyard et al. |
| 2011/0251822 | A1 | 10/2011 | Darley et al. |
| 2011/0252351 | A1 | 10/2011 | Sikora et al. |
| 2011/0281687 | A1 | 11/2011 | Gilley et al. |
| 2011/0283224 | A1 | 11/2011 | Ramsey et al. |
| 2011/0288381 | A1 | 11/2011 | Bartholomew et al. |
| 2011/0296312 | A1 | 12/2011 | Boyer et al. |
| 2011/0307723 | A1 | 12/2011 | Cupps et al. |
| 2012/0022336 | A1 | 1/2012 | Teixeira |
| 2012/0100895 | A1 | 4/2012 | Priyantha et al. |
| 2012/0109518 | A1 | 5/2012 | Huang |
| 2012/0116548 | A1 | 5/2012 | Goree et al. |
| 2012/0123806 | A1 | 5/2012 | Schumann et al. |
| 2012/0158289 | A1 | 6/2012 | Bernheim Brush et al. |
| 2012/0185268 | A1 | 7/2012 | Wiesner et al. |
| 2012/0219186 | A1 | 8/2012 | Wang et al. |
| 2012/0239173 | A1 | 9/2012 | Laikari et al. |
| 2012/0283855 | A1 | 11/2012 | Hoffman et al. |
| 2012/0289791 | A1 | 11/2012 | Jain et al. |
| 2012/0317520 | A1 | 12/2012 | Lee |
| 2013/0053990 | A1 | 2/2013 | Ackland et al. |
| 2013/0060167 | A1 | 3/2013 | Dracup et al. |
| 2013/0095459 | A1 | 4/2013 | Tran |
| 2013/0127636 | A1 | 5/2013 | Aryanpur et al. |
| 2013/0151874 | A1 | 6/2013 | Parks et al. |
| 2013/0166888 | A1 | 6/2013 | Branson et al. |
| 2013/0178334 | A1 | 7/2013 | Brammer |
| 2013/0187789 | A1 | 7/2013 | Lowe et al. |
| 2013/0190903 | A1 | 7/2013 | Balakrishnan et al. |
| 2013/0217979 | A1 | 8/2013 | Blackadar et al. |
| 2013/0218543 | A1 | 8/2013 | Bourgeois et al. |
| 2013/0225370 | A1 | 8/2013 | Flynt et al. |
| 2013/0234924 | A1 | 9/2013 | Janefalkar et al. |
| 2013/0250845 | A1* | 9/2013 | Greene ................... H04Q 9/00 370/315 |
| 2013/0289932 | A1 | 10/2013 | Baechler et al. |
| 2013/0304377 | A1 | 11/2013 | Van Hende |
| 2013/0312043 | A1 | 11/2013 | Stone et al. |
| 2013/0332286 | A1 | 12/2013 | Medelius et al. |
| 2013/0345978 | A1 | 12/2013 | Lush et al. |
| 2014/0018686 | A1 | 1/2014 | Medelius et al. |
| 2014/0046223 | A1 | 2/2014 | Kahn et al. |
| 2014/0094200 | A1 | 4/2014 | Schatzberg et al. |
| 2014/0135593 | A1 | 5/2014 | Jayalth et al. |
| 2014/0142732 | A1 | 5/2014 | Karvonen |
| 2014/0149754 | A1 | 5/2014 | Silva et al. |
| 2014/0156084 | A1 | 6/2014 | Rahman et al. |
| 2014/0159915 | A1* | 6/2014 | Hong ...................... H04Q 9/00 340/870.07 |
| 2014/0163927 | A1 | 6/2014 | Molettiere et al. |
| 2014/0164611 | A1 | 6/2014 | Molettiere et al. |
| 2014/0208333 | A1 | 7/2014 | Beals et al. |
| 2014/0218281 | A1 | 8/2014 | Amayeh et al. |
| 2014/0228649 | A1* | 8/2014 | Rayner ............... A61B 5/0002 600/595 |
| 2014/0235166 | A1 | 8/2014 | Molettiere et al. |
| 2014/0237028 | A1 | 8/2014 | Messenger et al. |

(56) References Cited

U.S. PATENT DOCUMENTS

| | | |
|---|---|---|
| 2014/0257533 A1 | 9/2014 | Morris et al. |
| 2014/0275821 A1 | 9/2014 | Beckman |
| 2014/0288680 A1 | 9/2014 | Hoffman et al. |
| 2014/0300490 A1 | 10/2014 | Kotz et al. |
| 2014/0336796 A1 | 11/2014 | Agnew |
| 2014/0337036 A1 | 11/2014 | Haiut et al. |
| 2014/0337450 A1 | 11/2014 | Choudhary et al. |
| 2014/0343380 A1 | 11/2014 | Carter et al. |
| 2014/0350883 A1 | 11/2014 | Carter et al. |
| 2014/0365107 A1 | 12/2014 | Dutta et al. |
| 2014/0372064 A1 | 12/2014 | Darley et al. |
| 2015/0006617 A1* | 1/2015 | Yoo ................ A61B 5/1112 709/203 |
| 2015/0037771 A1 | 2/2015 | Kaleal, III et al. |
| 2015/0042468 A1 | 2/2015 | White et al. |
| 2015/0057945 A1 | 2/2015 | White et al. |
| 2015/0094904 A1 | 4/2015 | Bourgeois et al. |
| 2015/0113417 A1 | 4/2015 | Yuen et al. |
| 2015/0119198 A1 | 4/2015 | Wisbey et al. |
| 2015/0119728 A1 | 4/2015 | Blackadar et al. |
| 2015/0127966 A1 | 5/2015 | Ma et al. |
| 2015/0141873 A1 | 5/2015 | Fei |
| 2015/0160026 A1 | 6/2015 | Kitchel |
| 2015/0180842 A1 | 6/2015 | Panther |
| 2015/0185815 A1 | 7/2015 | Debates et al. |
| 2015/0209615 A1 | 7/2015 | Edwards |
| 2015/0233595 A1 | 8/2015 | Fadell et al. |
| 2015/0272483 A1 | 10/2015 | Etemad et al. |
| 2015/0286285 A1 | 10/2015 | Pantelopoulos et al. |
| 2015/0312857 A1 | 10/2015 | Kim et al. |
| 2015/0317801 A1 | 11/2015 | Bentley et al. |
| 2015/0326709 A1 | 11/2015 | Pennanen et al. |
| 2015/0334772 A1 | 11/2015 | Wong et al. |
| 2015/0335978 A1 | 11/2015 | Syed et al. |
| 2015/0342533 A1 | 12/2015 | Kelner |
| 2015/0347983 A1 | 12/2015 | Jon et al. |
| 2015/0350822 A1 | 12/2015 | Xiao et al. |
| 2015/0362519 A1 | 12/2015 | Balakrishnan et al. |
| 2015/0374279 A1 | 12/2015 | Takakura et al. |
| 2015/0382150 A1 | 12/2015 | Ansermet et al. |
| 2016/0007288 A1* | 1/2016 | Samardzija ............ H04L 67/12 370/311 |
| 2016/0007934 A1 | 1/2016 | Arnold et al. |
| 2016/0012294 A1 | 1/2016 | Bouck |
| 2016/0018899 A1 | 1/2016 | Tu et al. |
| 2016/0023043 A1 | 1/2016 | Grundy |
| 2016/0026236 A1 | 1/2016 | Vasistha et al. |
| 2016/0034043 A1 | 2/2016 | Le Grand et al. |
| 2016/0034133 A1 | 2/2016 | Wilson et al. |
| 2016/0041593 A1 | 2/2016 | Dharawat |
| 2016/0058367 A1 | 3/2016 | Raghuram et al. |
| 2016/0058372 A1 | 3/2016 | Raghuram et al. |
| 2016/0059079 A1 | 3/2016 | Watterson |
| 2016/0072557 A1 | 3/2016 | Ahola |
| 2016/0081028 A1 | 3/2016 | Chang et al. |
| 2016/0081625 A1 | 3/2016 | Kim et al. |
| 2016/0084869 A1 | 3/2016 | Yuen et al. |
| 2016/0091980 A1 | 3/2016 | Baranski et al. |
| 2016/0104377 A1 | 4/2016 | French et al. |
| 2016/0105852 A1 | 4/2016 | Papakipos et al. |
| 2016/0135698 A1 | 5/2016 | Baxi et al. |
| 2016/0143579 A1 | 5/2016 | Martikka et al. |
| 2016/0144236 A1 | 5/2016 | Ko et al. |
| 2016/0148396 A1* | 5/2016 | Bayne ................ G06T 1/00 345/593 |
| 2016/0148615 A1 | 5/2016 | Lee et al. |
| 2016/0184686 A1 | 6/2016 | Sampathkumaran |
| 2016/0209907 A1 | 7/2016 | Han et al. |
| 2016/0226945 A1 | 8/2016 | Granqvist et al. |
| 2016/0259495 A1 | 9/2016 | Butcher et al. |
| 2016/0309409 A1 | 10/2016 | Lindman et al. |
| 2016/0317097 A1 | 11/2016 | Adams et al. |
| 2016/0327915 A1 | 11/2016 | Katzer et al. |
| 2016/0328991 A1 | 11/2016 | Simpson et al. |
| 2016/0346611 A1 | 12/2016 | Rowley et al. |
| 2016/0367202 A1 | 12/2016 | Carter et al. |
| 2016/0374566 A1 | 12/2016 | Fung et al. |
| 2016/0379547 A1 | 12/2016 | Okada |
| 2017/0010677 A1 | 1/2017 | Roh et al. |
| 2017/0011089 A1 | 1/2017 | Bermudez et al. |
| 2017/0011210 A1 | 1/2017 | Cheong et al. |
| 2017/0032256 A1 | 2/2017 | Otto et al. |
| 2017/0038740 A1 | 2/2017 | Knappe et al. |
| 2017/0043212 A1 | 2/2017 | Wong et al. |
| 2017/0063475 A1 | 3/2017 | Feng |
| 2017/0065230 A1 | 3/2017 | Sinha et al. |
| 2017/0087431 A1 | 3/2017 | Syed et al. |
| 2017/0124517 A1 | 5/2017 | Martin |
| 2017/0153119 A1 | 6/2017 | Nieminen et al. |
| 2017/0153693 A1 | 6/2017 | Duale et al. |
| 2017/0154270 A1 | 6/2017 | Lindman et al. |
| 2017/0168555 A1 | 6/2017 | Munoz et al. |
| 2017/0173391 A1 | 6/2017 | Wiebe et al. |
| 2017/0209743 A1 | 7/2017 | Bengtsson et al. |
| 2017/0228091 A1 | 8/2017 | Ogita |
| 2017/0232294 A1 | 8/2017 | Kruger et al. |
| 2017/0262699 A1 | 9/2017 | White et al. |
| 2017/0266494 A1 | 9/2017 | Crankson et al. |
| 2017/0316182 A1 | 11/2017 | Blackadar et al. |
| 2017/0340221 A1 | 11/2017 | Cronin et al. |
| 2018/0015329 A1 | 1/2018 | Burich et al. |
| 2018/0040290 A1 | 2/2018 | Liu et al. |
| 2018/0108323 A1 | 4/2018 | Lindman et al. |
| 2018/0193695 A1 | 7/2018 | Lee |
| 2018/0345077 A1 | 12/2018 | Blahnik et al. |
| 2019/0025928 A1 | 1/2019 | Pantelopoulos et al. |
| 2019/0056777 A1 | 2/2019 | Munoz et al. |
| 2019/0069244 A1 | 2/2019 | Jeon et al. |
| 2019/0282857 A1 | 9/2019 | Hapola et al. |
| 2019/0367143 A1 | 12/2019 | Sinclair et al. |

FOREIGN PATENT DOCUMENTS

| | | |
|---|---|---|
| CN | 101408429 A | 4/2009 |
| CN | 101713660 A | 5/2010 |
| CN | 102495756 A | 6/2012 |
| CN | 102684755 A | 9/2012 |
| CN | 103309428 A | 9/2013 |
| CN | 103631359 A | 3/2014 |
| CN | 103970271 A | 8/2014 |
| CN | 204121706 U | 1/2015 |
| CN | 104680046 A1 | 6/2015 |
| CN | 105051494 A | 11/2015 |
| CN | 105242779 A1 | 1/2016 |
| CN | 105706093 A | 6/2016 |
| CN | 106062661 A | 10/2016 |
| CN | 106170247 A | 11/2016 |
| CN | 106465056 A | 2/2017 |
| CN | 106604369 A | 4/2017 |
| CN | 106984025 A | 7/2017 |
| CN | 106999106 A | 8/2017 |
| CN | 107391604 A | 11/2017 |
| CN | 108010562 A | 5/2018 |
| CN | 108052272 A | 5/2018 |
| CN | 103154954 B | 6/2018 |
| CN | 108377264 A | 8/2018 |
| CN | 108403110 A | 8/2018 |
| CN | 108961719 A | 12/2018 |
| CN | 108983873 A | 12/2018 |
| EP | 1755098 A2 | 2/2007 |
| EP | 2096820 A1 | 9/2009 |
| EP | 2098165 A1 | 9/2009 |
| EP | 2107837 A1 | 10/2009 |
| EP | 2172249 A2 | 4/2010 |
| EP | 2770454 A1 | 8/2014 |
| EP | 2703945 A2 | 3/2015 |
| EP | 2849473 A1 | 3/2015 |
| EP | 2910901 A1 | 8/2015 |
| EP | 2996409 A1 | 3/2016 |
| EP | 3018582 A2 | 5/2016 |
| EP | 3023859 A1 | 5/2016 |
| EP | 3091710 A1 | 11/2016 |
| EP | 3361370 A | 8/2018 |
| FI | 126911 B | 2/2017 |

(56) References Cited

FOREIGN PATENT DOCUMENTS

| | | | |
|---|---|---|---|
| GB | 2404593 | A | 2/2005 |
| GB | 2425180 | A | 10/2006 |
| GB | 2513585 | A | 11/2014 |
| GB | 2530196 | A | 3/2016 |
| GB | 2537423 | A | 10/2016 |
| GB | 2541234 | A | 2/2017 |
| GB | 2555107 | A | 4/2018 |
| GB | 2555639 | A | 5/2018 |
| KR | 20110070049 | A | 6/2011 |
| KR | 101500662 | B1 | 3/2015 |
| RU | 94832 | U1 | 6/2010 |
| SE | 528295 | C2 | 10/2006 |
| TW | M511837 | U | 11/2015 |
| TW | I554266 | B | 10/2016 |
| TW | 201706840 | A | 2/2017 |
| TW | I598076 | A | 9/2018 |
| WO | WO02054157 | A1 | 7/2002 |
| WO | WO2010083562 | A1 | 7/2010 |
| WO | WO2015131065 | A1 | 9/2010 |
| WO | WO2010144720 | A1 | 12/2010 |
| WO | WO2011123932 | A1 | 10/2011 |
| WO | WO2012037637 | A1 | 3/2012 |
| WO | WO2012115943 | A1 | 8/2012 |
| WO | WO2012141827 | A2 | 10/2012 |
| WO | WO2013091135 | A1 | 6/2013 |
| WO | WO2013121076 | A1 | 8/2013 |
| WO | WO2013121325 | A2 | 8/2013 |
| WO | WO2014118767 | A1 | 8/2014 |
| WO | WO2014144258 | A2 | 9/2014 |
| WO | WO2014193672 | A1 | 12/2014 |
| WO | WO2014209697 | A1 | 12/2014 |
| WO | WO2015021407 | A1 | 2/2015 |
| WO | WO2014182162 | A3 | 6/2015 |
| WO | WO2015087164 | A1 | 6/2015 |
| WO | WO2011061412 | A1 | 8/2015 |
| WO | WO2016022203 | A1 | 2/2016 |
| WO | WO2016037012 | A1 | 3/2016 |
| WO | WO2017011818 | A1 | 1/2017 |
| WO | WO2018217348 | A1 | 11/2018 |
| WO | WO2018222936 | A1 | 12/2018 |

OTHER PUBLICATIONS

ARM big. Little. Wikipedia, The free encyclopedia, Oct. 11, 2018, Retrieved on May 28, 2020 from: <https://en.wikipedia.org/w/index.php?title=ARM_bit.LITTLE&oldid=863559211> foreword on p. 1, section "Run-state migration" on pp. 1-2.

Qualcomm Snapdragon Wear 3100 Platform Supports New Ultra-Low Power System Architecture for Next Generation Smartwatches. Qualcomm Technologies, Inc., Sep. 10, 2018, Retrieved on May 28, 2020 from: <https://www.qualcomm.com/news/releases/2018/09/10/qualcomm-snapdragon-wear-3100-platform-supports-new-ultra-low-power-system> section "Spandragon Wear 3100 Based Smartwatches Aim to Enrich the User Experience".

CNET: Dec. 11, 2017, "Apple watch can now sync with a treadmill", youtube.com, [online], Available from: https://www.youtube.com/watch?v=7RvMC3wFDME [ Accessed Nov. 19, 2020].

CASH: A guide to GPS and route plotting for cyclists. 2018. www.cyclinguk.org/article/guide-gps-and-route-plotting-cyclists.

Sieber et al: Embedded systems in the Poseidon MK6 rebreather. Intelligent Solutions in Embedded Systems, 2009, pp. 37-42.

Ainsworth et al: Parallel Error Detection Using Heterogeneous Cores. 48th Annual IEEE/IFIP International Conference on Dependable Systems and Networks (DSN), 2018, IEEE, 2018.

Davis: The Best Technical Diving Computers 2019. Feb. 7, 2019.

\* cited by examiner

COMMUNICATING SENSOR DATA IN WIRELESS COMMUNICATION SYSTEMS

RELATED APPLICATIONS

This application is a continuation-in-Part of U.S. patent application Ser. No. 15/382,763, filed on Dec. 19, 2016, which claims priority to Finnish patent application No. 20155989, filed on Dec. 21, 2015, Ser. No. 15/386,050, claiming priority of Finnish patent application 20165707, Ser. No. 15/386,062, which claims the priority of Finnish patent application 20165709, and Ser. No. 15/386,074, claiming the priority of Finnish patent application 20165710. The subject matter of these is incorporated by reference in their entirety.

FIELD

Embodiments of the present invention relate in general to communicating sensor data. More specifically, embodiments of the present invention relate to communicating sensor data in wireless communication systems.

BACKGROUND

Sensor technology enables new and fascinating applications that can be used to address various societal, industrial, environmental, and economical challenges. A large number of various sensors have been developed for different purposes. For instance, sensors may be used for measuring acceleration, moisture, temperature, heart rate, or a blood oxygen level. In case of many sensor applications, it is desirable to communicate the information measured by a sensor to some other, distant device, such as a server.

Wireless communications are free from the physical constraints of communication cables. Wireless communication systems are thus a very alluring communication solution for many sensor applications. Furthermore, wireless communication systems are often preferred over wired systems because of low installation costs, ease of maintenance and flexibility. Nevertheless, wireless communication systems typically have limited resources and the number of wireless devices communicating over wireless communication systems is constantly increasing. There is therefore a need to provide more efficient solutions for communicating sensor data in wireless communication systems.

SUMMARY

According to some example aspects, there is provided the subject-matter of the independent claims. Some example embodiments are defined in the dependent claims.

According to a first example aspect, there is provided a mobile terminal, comprising a non-cellular receiver configured to receive first sensor data from a first wireless sensor node and second sensor data from the first or a second wireless sensor node, a processor configured to determine whether the second sensor data is a duplicate of the first sensor data and a cellular transmitter configured to transmit, responsive to the determination, third sensor data to a server, wherein said third sensor data is based on at least one of said first and second sensor data.

According to the first example aspect, responsive to the determination that the second sensor data is a duplicate of the first sensor data, the processor may be further configured to discard said second sensor data and the cellular transmitter may be further configured to transmit said third sensor data, wherein said third sensor data comprises said first sensor data and not second sensor data.

According to the first example aspect, responsive to the determination that the second sensor data is not a duplicate of the first sensor data, the cellular transmitter may be further configured to transmit said third sensor data, wherein said third sensor data comprises first sensor data and second sensor data.

According to the first example aspect, the mobile terminal may further comprise a buffer for buffering said first sensor data for a period of time and the processor may be further configured to determine, at the end of the period of time, whether the second sensor data is a duplicate of the first sensor data.

According to the first example aspect, the mobile terminal may further comprise a buffer for buffering unique sensor data for a period of time, possibly for last X seconds and the cellular transmitter may be further configured to transmit oldest sensor data to the server.

According to the first example aspect, the mobile terminal may further comprise a cellular receiver configured to receive, responsive to transmitting said third sensor data to the server, processed sensor data associated with said third sensor data. In some embodiments, the cellular receiver may be further configure to receive, responsive to transmitting said third sensor data to the server, a security key from the server and the processor may be further configured to decrypt said processed sensor data using the security key.

According to the first example aspect, the processor may be configured to determine a security key based on said third sensor data and the processor may be further configured to obtain information using the security key. In some embodiments, said information may be received from the server or said information is retrieved from the Internet.

According to the first example aspect, the non-cellular receiver may be further configured to receive a first broadcast transmission comprising said first sensor data and a second broadcast transmission comprising said second sensor data, wherein said first and second broadcast transmissions possibly comprise advertisement messages.

According to the first example aspect, said first and second sensor data are associated with a sports application, IoT application or artificial intelligence application.

According to the first example aspect, the non-cellular receiver may be configured to receive sensor data from N wireless sensor nodes.

According to a second example aspect, there is provided a system comprising multiple mobile terminals according to the first example aspect.

According to a third example aspect, there is provided a server comprising a receiver configured to receive third sensor data from a first mobile terminal and fourth sensor from a second mobile terminal, a processor configured to determine whether the fourth sensor data is a duplicate of the third sensor data and a transmitter configured to transmit, responsive to the determination, processed sensor data to the first mobile terminal, wherein said processed sensor data is based on at least one of said third and fourth sensor data.

According to the third example aspect, responsive to the determination that the fourth sensor data is a duplicate of the third sensor data, the processor may be further configured to discard said fourth sensor data and the transmitter may be further configured to transmit said processed sensor data, wherein said processed sensor data is based on said third sensor data and not fourth sensor data.

According to the third example aspect, responsive to the determination that the fourth sensor data is not a duplicate of the third sensor data, the transmitter may be further configured to transmit said processed sensor data, wherein said processed sensor data is based on said third and fourth sensor data.

According to the third example aspect, the transmitter may be further configure to transmit, responsive to receiving said third sensor data from the first mobile terminal, a security key to the first mobile terminal and the processor may be further configured to encrypt said processed sensor data using the security key.

According to the third example aspect, the processor may be configured to determine a security key based on said third sensor data and the processor may be further configured to encrypt said processed sensor data using the security key.

According to the third example aspect, said first and second sensor data are associated with a sports application, IoT application or artificial intelligence application.

According to the third example aspect, the processor may be configured to discard duplicates of sensor data received from mobile terminals and the processor may be configured to store remaining, unique sensor data to a database and/or process remaining, unique sensor data.

According to a fourth example aspect, there is provided a first method for a mobile terminal, comprising receiving first sensor data from a first wireless sensor node and second sensor data from the first or a second wireless sensor node, determining whether the second sensor data is a duplicate of the first sensor data and transmitting, responsive to the determination, third sensor data to a server, wherein said third sensor data is based on at least one of said first and second sensor data.

According to the fourth example aspect, the first method may further comprise responsive to the determination that the second sensor data is a duplicate of the first sensor data, discarding said second sensor data and transmitting said third sensor data, wherein said third sensor data comprises said first sensor data and not second sensor data.

According to the fourth example aspect, the first method may further comprise responsive to the determination that the second sensor data is not a duplicate of the first sensor data, transmitting said third sensor data, wherein said third sensor data comprises first sensor data and second sensor data.

According to the fourth example aspect, the first method may further comprise buffering said first sensor data for a period of time and determining, at the end of the period of time, whether the second sensor data is a duplicate of the first sensor data.

According to the fourth example aspect, the first method may further comprise buffering unique sensor data for a period of time, possibly for last X seconds and transmitting oldest sensor data to the server.

According to the fourth example aspect, the first method may further comprise receiving, responsive to transmitting said third sensor data to the server, processed sensor data associated with said third sensor data.

According to the fourth example aspect, the first method may further comprise receiving, responsive to transmitting said third sensor data to the server, a security key from the server and decrypting said processed sensor data using the security key.

According to the fourth example aspect, the first method may further comprise determining a security key based on said third sensor data and obtaining information using the security key.

According to the fourth example aspect, said information may be received from the server or said information may be retrieved from the Internet.

According to the fourth example aspect, the first method may further comprise receiving a first broadcast transmission comprising said first sensor data and a second broadcast transmission comprising said second sensor data, wherein said first and second broadcast transmissions possibly comprise advertisement messages.

According to the fourth example aspect, said first and second sensor data are associated with a sports application, IoT application or artificial intelligence application.

According to the fourth example aspect, the first method may further comprise receiving sensor data from N wireless sensor nodes.

According to a fifth example aspect, there is provided a second method comprising receiving third sensor data from a first mobile terminal and fourth sensor from a second mobile terminal, determining whether the fourth sensor data is a duplicate of the third sensor data and transmitting, responsive to the determination, processed sensor data to the first mobile terminal, wherein said processed sensor data is based on at least one of said third and fourth sensor data.

According to the fifth example aspect, the second method may further comprise responsive to the determination that the fourth sensor data is a duplicate of the third sensor data, discarding said fourth sensor data and transmitting said processed sensor data, wherein said processed sensor data is based on said third sensor data and not fourth sensor data.

According to the fifth example aspect, the second method may further comprise responsive to the determination that the fourth sensor data is not a duplicate of the third sensor data, transmitting said processed sensor data, wherein said processed sensor data is based on said third and fourth sensor data.

According to the fifth example aspect, the second method may further comprise transmitting, responsive to receiving said third sensor data from the first mobile terminal, a security key to the first mobile terminal and encrypting said processed sensor data using the security key.

According to the fifth example aspect, the second method may further comprise determining a security key based on said third sensor data and encrypting said processed sensor data using the security key.

According to the fifth example aspect, said first and second sensor data may be associated with a sports application, IoT application or artificial intelligence application.

According to the fifth example aspect, the second method may further comprise discarding duplicates of sensor data received from mobile terminals and storing remaining, unique sensor data to a database and/or processing remaining, unique sensor data.

According to a sixth example aspect, there is provided an apparatus comprising means for performing the first method. According to a seventh example aspect, there is provided an apparatus comprising means for performing the second method.

According to an eighth example aspect, there is provided non-transitory computer readable medium having stored thereon a set of computer readable instructions that, when executed by at least one processor, cause an apparatus to at least perform the first method. According to a ninth example aspect, there is provided non-transitory computer readable medium having stored thereon a set of computer readable instructions that, when executed by at least one processor, cause an apparatus to at least perform the second method.

According to a tenth example aspect, there is provided a computer program configured to perform the first method. According to an eleventh example aspect, there is provided a computer program configured to perform the second method.

EMBODIMENTS

Operation of wireless communication systems may be improved by the procedures described herein. More specifically, operation of wireless communication systems for communicating sensor data may be improved. Wireless sensor nodes may gather and transmit sensor data associated with a sports event to a server, wherein the server is for the sports event as well. Said sensor data may be transmitted to the server via mobile terminals.

Wireless sensor nodes may transmit the sensor data to said mobile terminals using non-cellular communications. Said mobile terminals may then relay the sensor data, or a part of it, to the server using cellular communications. Moreover, said mobile terminals and the server may determine whether the received sensor data comprises duplicates and then discard the duplicates, if received. Embodiments of the present invention thereby enable more efficient operation of wireless communication systems by using both, non-cellular and cellular communications, and discarding duplicates of sensor data.

Figure 1:
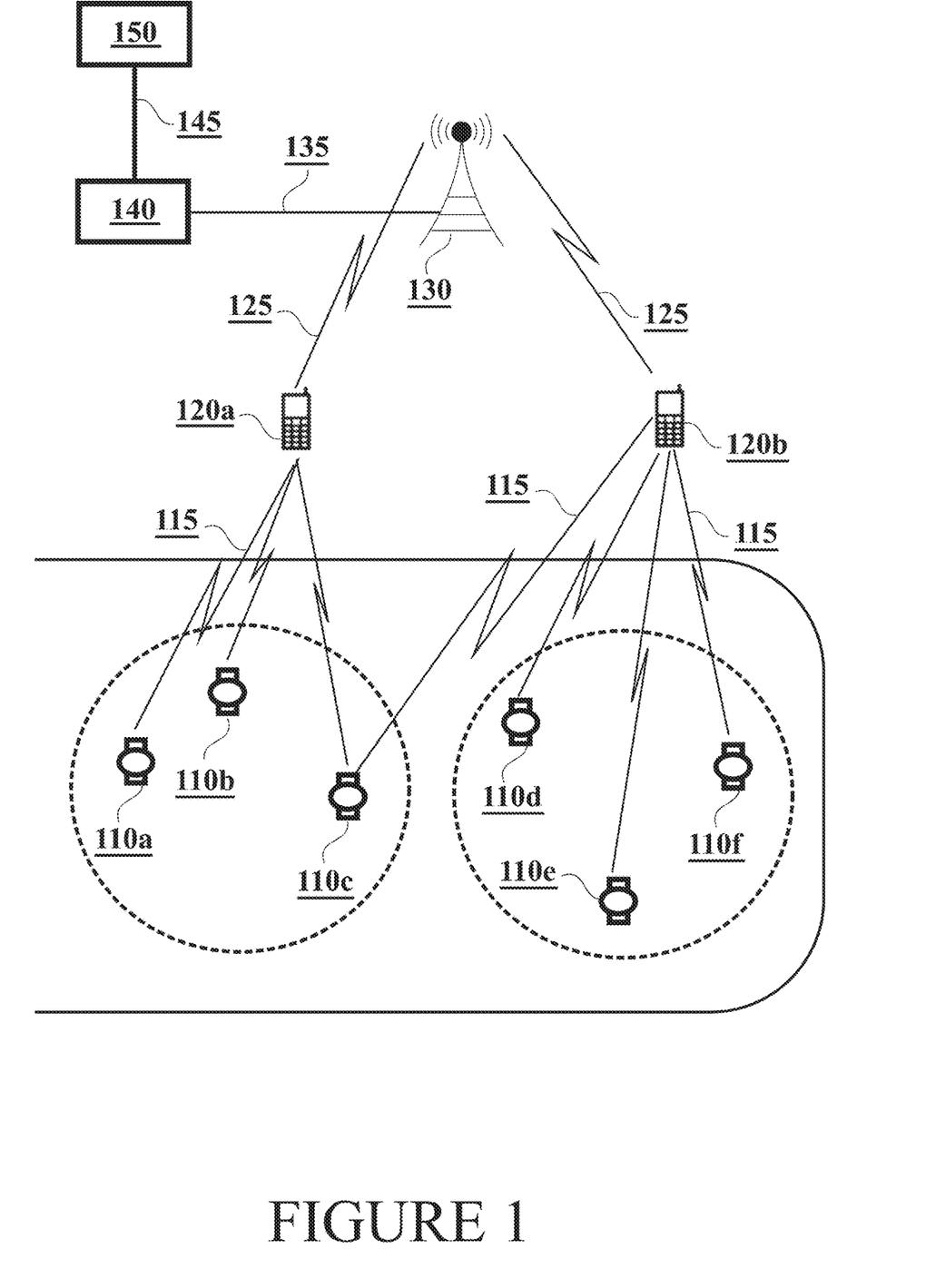
FIG. 1 illustrates an exemplary scenario in accordance with at least some embodiments of the present invention.

FIG. 1 illustrates an exemplary scenario in accordance with at least some example embodiments. According to the example scenario of FIG. 1, there may be a wireless communication system. The wireless communication system may comprise wireless sensor nodes 110a-f, mobile terminals 120a and 120b, wireless network node 130, core network element 140 and server 150. Wireless sensor nodes 110a-c may communicate with mobile terminal 120a via air interface 115. Wireless sensor nodes 110d-f may communicate with mobile terminal 120b via air interface 115. In addition, in some embodiments, a transmission from wireless sensor node 110c may be received by mobile terminal 120b as well. In some embodiments, wireless sensor node 110a may be referred to as a first wireless sensor node and wireless sensor node 110b may be referred to as a second wireless sensor node.

A wireless sensor node 110a-f may be a smart watch, digital watch, smartphone, phablet device, tablet device, heart rate belt, or another type of suitable wireless device. Wireless sensor node 110a-f may comprise a display, which may comprise a touchscreen display, for example. The display may be limited in size. An example of a limited-size display is a display worn on a wrist. Wireless sensor nodes 110a-f may be powered, for example, by a rechargeable battery. Moreover, wireless sensor nodes 110a-f may comprise, or be coupled with, at least one sensor, such as, for example, an acceleration sensor, moisture sensor, temperature sensor, heart rate sensor or a blood oxygen level sensor.

The sensors may be configured to measure acceleration, rotation, moisture, pressure and/or other variables, for example. In one specific embodiment, the sensors are configured to measure acceleration along three mutually orthogonal axes and rotation about three mutually orthogonal axes. The sensors may comprise single-or multi-axis magnetic field sensors, skin signal EMG, ECG, heartbeat and/or optical pulse sensors. Additionally or alternatively, human activity may be sensed via motion or use of sport utensils, tools, machinery and/or devices.

The data measured by the sensors may be associated with a sports application, Internet of Things, IoT, application or artificial intelligence application. For example, the sports application may be related to a sports event, such as an ice hockey game, wherein sensors may be attached to players and spectators carry mobile terminals for relaying sensor data. Moreover, the IoT application may be related to smart cities, wherein sensors may monitor traffic and pedestrians carry mobile terminals for relaying sensor data. Similarly, in case of connected cars, the cars may comprise mobile terminals for relaying sensor data. In the context of artificial intelligence, such as in artificial neural networks, sensors may be used for providing user-generated content which is then relayed to a server for processing.

Mobile terminals 120a and 120b may be connected to, and possibly communicate with, wireless network node 130 via air interface 125. Mobile terminal 120a-b may be, for example, a smartphone, a cellular phone, a User Equipment, UE, a Machine-to-Machine, M2M, node, Machine-Type Communications, MTC, node, an IoT node, a laptop computer, a tablet computer or, indeed, any kind of suitable mobile station or wireless terminal in general. In some embodiments, mobile terminal 120a may be referred to as a first mobile terminal and mobile terminal 120b may be referred to as a second mobile terminal. In general, mobile terminals may be ad hoc mobile base stations, which may hear or listen to N wireless sensor nodes, i.e., may receive sensor data from N wireless sensor nodes.

Air interface 115 between wireless sensor node 110a-f and mobile terminal 120a-b may be configured in accordance with a first radio communication technology which both wireless sensor node 110a-f and mobile terminal 120a-b are configured to support. Moreover, air interface 125 between mobile terminal 120a-b and wireless network node 130 may be configured in accordance with a second radio communication technology which both mobile terminal 120a-b and wireless network node 130 are configured to support.

Thus, wireless sensor node 110a-f may communicate with mobile terminal 120a-b over air interface 115 in accordance with the first radio communication technology. Mobile terminal 120a-b may also communicate with wireless network node 130 over air interface 125 in accordance with the second radio communication technology. In some embodiments of the present invention, said first radio communication technology may be a non-cellular communication technology while said second radio communication technology may be a cellular communication technology.

Thus, wireless sensor node 110a-f may comprise a transmitter and a receiver, or a transceiver, for communicating using a non-cellular communication technology. Mobile terminal 120a-b may comprise a transmitter and a receiver, or a transceiver, for communicating using a non-cellular communication technology, and a transmitter and a receiver, or a transceiver, for communicating using a cellular communication technology. Wireless network node 130 may comprise a transmitter and a receiver, or a transceiver, for communicating using a cellular communication technology.

Examples of cellular communication technologies include Long Term Evolution, LTE, New Radio, NR, which may also be known as fifth generation, 5G, radio access technology and MulteFire. On the other hand, examples of non-cellular communication technologies include Wireless Personal Area Network, WPAN, Wireless Local Area Network, WLAN, and Worldwide Interoperability for Microwave Access, WiMAX. For example, in some embodiments of the present invention the non-cellular communication technology may be a WPAN, such as Bluetooth, Zigbee or Wireless Universal Serial Bus, USB. In some embodiments of the present invention, Bluetooth may be preferred, e.g., Bluetooth Low Energy, BLE.

In case of cellular communication technology, wireless network node 130 may be referred to as a Base Station, BS. For example, in the context of LTE, a BS may be referred to as eNB while in the context of NR, a BS may be referred to as gNB. In case of both, LTE and NR, mobile terminals 120a and 120b may be referred to as User Equipments, UEs. So in case of NR for instance, UEs 120a and 120b may communicate wirelessly with gNB 130, or a cell of gNB 130, via air interface 125.

In any case, example embodiments are not restricted to any particular radio communication technology. Instead, example embodiments may be exploited in any wireless communication system which exploits non-cellular and cellular communication technologies for transmitting sensor data.

Wireless network node 130 may be connected, directly or via at least one intermediate node, with core network 140 via interface 135. Interface 135 may be a wire-line or wireless link. Interface 135 may be referred to as a backhaul link as well. Moreover, core network 140 may be, in turn, coupled via interface 145 with server 150. Server 150 may be suitable for processing sensor data, e.g., for a sports event. Core network 140 may be connected to server 150 via another network (not shown in FIG. 1), for example via a worldwide interconnection network.

Embodiments of the present invention may be exploited in various wireless sensor applications, such as in applications related to sports, IoT or artificial intelligence. For example, in the context of sports, spectators may be interested in a sport event. The spectators may have mobile terminal 120a-b, such as a mobile phone, with them and mobile terminals 120a-b of the spectators may be exploited for communicating sensor data associated with the sports event efficiently. Wireless sensor nodes 110a-f may be attached to players and comprise a sensor for measuring moving direction, distance, acceleration, heart rate, etc.

Wireless sensor nodes 110a-f may generate sensor data based on measurements. Then, mobile terminal 120a-b of the spectators may be used to relay sensor data from wireless sensor nodes 120a-f to server 150. For example, mobile terminal 120a may receive sensor data from wireless sensor nodes 110a-c and relay the sensor data to server 150. Also, mobile terminal 120b may receive sensor data from wireless sensor nodes 110d-f, and possibly from wireless sensor node 120c as well, and relay the sensor data to server 150. Server 150 may be associated with the sports event and it may process received sensor data to generate interesting information for the spectators of the sports event.

As an example, ice hockey players may wear skates and one or more sensors may be attached to the skates. Other sensors may be attached to different parts of the bodies of the ice hockey players as well. In addition, one or more wireless sensor nodes 110a-f may be associated with, or coupled to, the sensors. One wireless sensor node 110a-f may be attached to one player. Wireless sensor nodes 110a-f may comprise a transmitter for transmitting the information gathered by the sensors to server 150.

However, there may be many wireless sensor nodes 110a-f and a lot of spectators, which carry mobile terminals 120a-b, in an ice hockey hall. Mobile terminals 120a-b may use a cellular communication system for phone calls and browsing the Internet, for example. Thus, if in a sports event wireless sensor nodes 110a-f would communicate to server 150 using the cellular communication system, the cellular communication system would become congested, thereby decreasing the quality of service experienced by the spectators.

Therefore, some embodiments of the present invention enable saving of resources of a cellular communication system, because wireless sensor nodes 110a-f do not need to communicate sensor data using the cellular communication system. In addition, wireless sensor nodes 110a-f may be cheaper because those do not need to have a transmitter for cellular communication. Instead, wireless sensor nodes 110a-f may communicate with server 150 via mobile terminal 120a-b, using non-cellular communication technology. In some embodiments, the used non-cellular communication technology may be a WPAN, such as Bluetooth.

However, several technical challenges need to be solved to enable efficient communication of sensor data from wireless sensor nodes 110a-f to server 150. For example, an ad hoc network may need to be setup and organized for non-cellular communication between wireless sensor nodes 110a-f and mobile terminals 120a-b. Moreover, non-cellular communication between wireless sensor nodes 110a-f and mobile terminals 120a-b may need to be configured again every now and then if, for example, wireless sensor nodes 110a-f and/or mobile terminals 120a-b move.

For example, an ice hockey player carrying wireless sensor node 110a-f may skate from one end of the ice hockey rink to the other end of the ice hockey rink and in such a case wireless sensor node 110a-f attached to the player may be disconnected from, e.g., first mobile terminal 120a. Also, if a spectator carrying first mobile terminal 120a would decide to leave the arena or go behind the stands to buy something, the connection may be lost.

Non-cellular communication links typically have a short range, which enables efficient use of the spectrum because a frequency band may be reused within a short distance. However, the short range of a non-cellular communication link may cause challenges as well. If for example first mobile terminal 120a starts to move, it may be out of range of a certain wireless sensor node rather quickly. Consequently, there would be a need for fast setup of a connection to second mobile terminal 120b, to ensure continuous connectivity. In some embodiments of the present invention, broadcast transmission are hence used to transmit sensor data from wireless sensor nodes 110a-f to mobile terminals 120a-b, thereby avoiding delays associated with setting up of a new connection.

Also, packets may get lost occasionally if the non-cellular connection between one wireless sensor node and one mobile terminal does not work properly. There is therefore a need to ensure operation in such a case. That is to say, if one packet would get lost, it should not affect the operation, at least not significantly. According to some embodiments of the present invention, sensor data that is broadcasted by one wireless sensor node 110a-f may be received by both, first mobile terminal 120*a* and second mobile terminal 120*b*. That is to say, both first mobile terminal 120*a* and 120*b* may receive broadcast transmissions from wireless sensor node 110*c*. So even if first mobile terminal 120*a* would not receive the sensor data from wireless sensor node 110*c* correctly at some point, second mobile terminal 120*b* may be able to forward said sensor data from wireless sensor node 110*c* to server 150. Thus, the impact of packet losses may be minimized.

However, an additional technical challenge is related to a situation wherein both mobile terminals 120*a* and 120*b* receive the sensor data correctly from wireless sensor node 110*c* and forward the sensor data to server 150. In such a case, server 150 may receive a duplicate of sensor data, which may be discarded according to some embodiments of the present invention.

In addition, or alternatively, the impact of packet losses may be minimized if wireless sensor nodes 120*a-f* transmit multiple copies of the same sensor data. However, in such a case mobile terminals 120*a* and 120*b* may determine whether there are duplicates and if so, discard the duplicates before transmitting the sensor data to server 150 using cellular communications. Thus, efficiency of the cellular communication system is improved because unnecessary transmissions may be avoided.

Another issue is that mobile terminals 120*a-b*, or spectators carrying mobile terminals 120*a-b*, may need to have an incentive for participating in the process. Without an incentive mobile terminals 120*a-b*, or spectators carrying mobile terminals 120*a-b*, may decide not to relay sensor data from wireless network nodes 110*a-f* to server 150.

Therefore, in some embodiments only mobile terminals 120*a-b* that participate in the process, i.e., relay sensor data, may be able to receive, and possibly decrypt, processed sensor data transmitted by server 150. For example, in case of a sports event, server 150 associated with the sports event may process received sensor data and then transmit said processed sensor data to mobile terminals 120*a-b*. The processed sensor data may be interesting for spectators of the sports event, thereby giving an incentive for mobile terminals 120*a-b*, or spectators carrying mobile terminals 120*a-b*, to participate in the process. The processed sensor data may provide, e.g., a complete view of the movement of all of the ice hockey players during a game and some statistics related to the game as well. That is to say, said processed sensor data may be associated with the sports event and the processed sensor data may be based on the sensor data gathered by wireless sensor nodes 110*a-f*.

Moreover, another technical challenge is that typically there are multiple wireless sensor nodes 110*a-f* associated with the sports event. Nevertheless, all of wireless sensor nodes 110*a-f* may not be able to connect to a same master node, such as first mobile terminal 120*a*. Reason may be for example that the number of wireless sensor nodes 110*a-f* is too high or a distance from some wireless sensor nodes 110*a-f* to first mobile terminal 120*a* is too large.

On the other hand, there may be also multiple mobile terminals 120*a-b*, because the number of spectators is usually rather high. For instance, in case of ice hockey games the number of spectators may be between 10,000 and 20,000. The number of mobile terminals 120*a-b* that may be used for relying sensor data from wireless sensor nodes 110*a-f* to server 150 would be thus high as well. So if for example a broadcast transmission of wireless sensor node 110*d* cannot be received by first mobile terminal 110*a*, the broadcast transmission of wireless sensor node 110*d* may be received by second mobile terminal 120*b*. Some embodiments of the present invention therefore provide means for transmitting sensor data via different mobile terminals using broadcast transmission.

Figure 2:
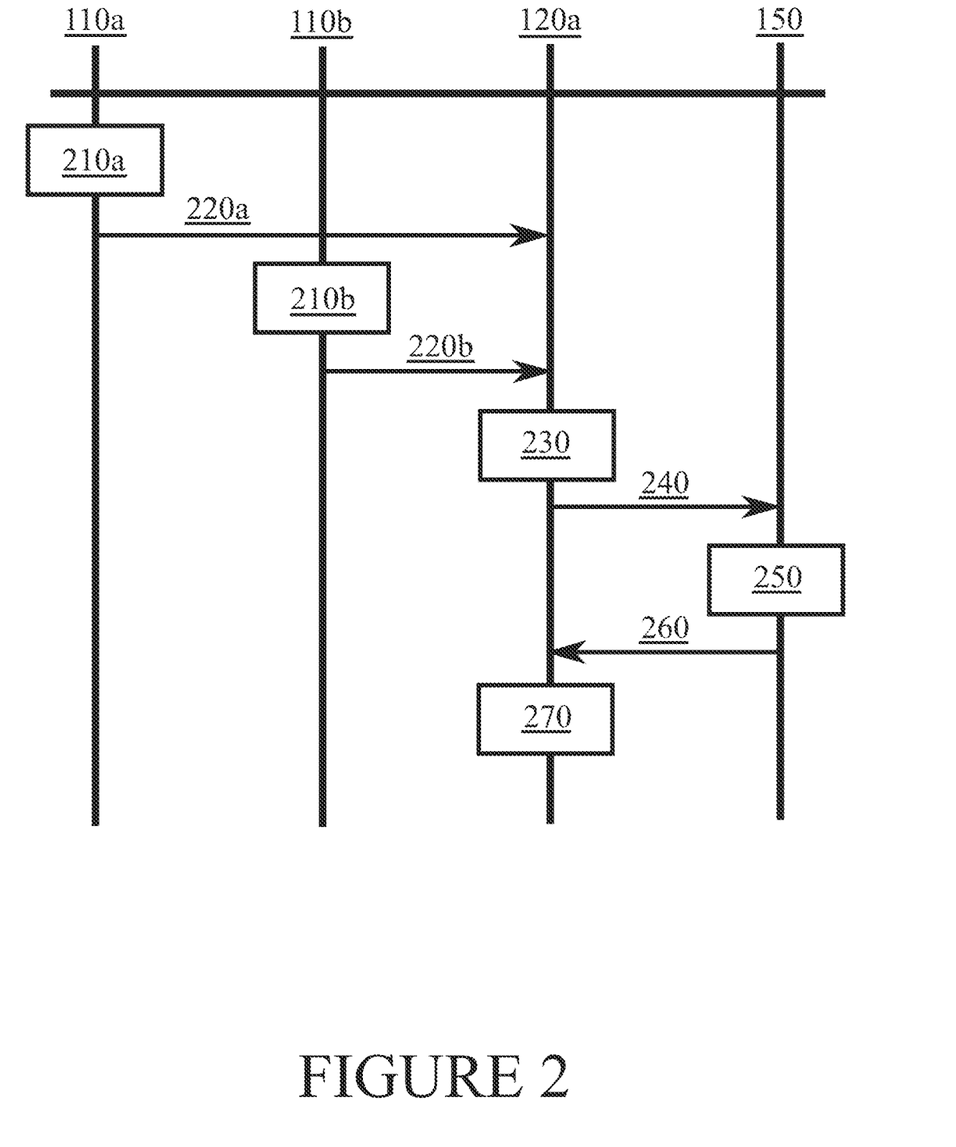
FIG. 2 illustrates a signalling graph in accordance with at least some embodiments of the present invention.

FIG. 2 illustrates a signalling graph in accordance with at least some embodiments of the present invention. FIG. 2 illustrates signalling associated with first wireless sensor node 110*a*, second wireless sensor node 110*b*, first mobile terminal 120*a* and server 150. Nevertheless, similar signalling may be carried out between various wireless sensor nodes and mobile terminals, for example, between fourth wireless sensor node 110*d*, fifth wireless sensor node 110*e*, second mobile terminal 120*b* and server 150.

At step 210*a*, first wireless sensor node 110*a* may decide to transmit first sensor data to wireless network node 120*a*. Step 210*a* may also comprise encrypting, by first wireless sensor node 110*a*, first sensor data for enabling secure communication between first wireless sensor node 110*a* and first mobile terminal 120*a*. The decision to transmit first sensor data may be based on detecting an event which triggers the transmission. Alternatively, transmissions of sensor data may be periodic, i.e., the decision to transmit first sensor data may be based on detecting that a certain time has elapsed after the last transmission. At step 210, first wireless sensor node 110*a* may also perform measurements for generating said first sensor data. For example, first wireless sensor node may measure acceleration, heart-beat, etc., and generate said first sensor data based on the measurements. Step 210*b* may be performed by second wireless sensor node 110*b* similarly as step 210*a*.

At step 220*a*, first wireless sensor node 110*a* may transmit said first sensor data to first mobile terminal 120*a*. In addition, an identity of first wireless sensor node 110*a* may be transmitted along with said first sensor data. The identity of first wireless sensor node 110*a* may be for example an identity of a Movesense®-device. First wireless sensor node 110*a* may comprise a non-cellular transmitter and transmit said first sensor data using non-cellular communication technology, such as WPAN. In some embodiments, Bluetooth may be used. Thus, resources of a cellular communication system may be saved. In addition, first wireless sensor node 120*a* does not need to have a cellular transmitter, which reduces costs.

Moreover, in some embodiments, the non-cellular transmission may be encrypted, thereby enabling secure communication between first wireless sensor node 110*a* and first mobile terminal 120*a*. Alternatively, or in addition, the non-cellular transmission may be a broadcast transmission, such as an advertisement message. In some embodiments, said broadcast transmission may be received by some other mobile terminal as well, such as second mobile terminal 120*b*, which increases the likelihood of successful transmission if first mobile terminal 120*a* does not receive the transmission for some reason. Also, in some embodiments, first wireless sensor node 110*a* may transmit multiple copies of the first sensor data, to improve the likelihood of successful transmission. That is to say, first mobile may also transmit second sensor data at step 220*a*, wherein said second sensor data is a duplicate of said first sensor data. Step 220*b* may be performed by second wireless sensor node 110*b* similarly as step 220*a*.

Mobile terminal 120*a* may comprise a non-cellular receiver for receiving non-cellular transmissions. Hence, mobile terminal 120*a* may receive first sensor data from first wireless sensor node 110*a* at step 220*a*, and second sensor data from second wireless network node 110*b*, at step 220*b*, using the non-cellular receiver. Alternatively, mobile terminal 120*a* may receive first and second sensor data from first wireless sensor node 110*a* at step 220*a*.

If the non-cellular transmissions are encrypted, mobile terminal may decrypt said first and/or second sensor data. In some embodiments, first mobile terminal 120*a* may comprise an application for listening to non-cellular transmissions, especially for broadcast transmissions. A user of first mobile terminal 120*a* may therefore decide whether to participate in the process using the application. As an example, the user of first mobile terminal 120*a* may instruct an application layer of mobile terminal 120*a*, possibly via a user interface, to give a command to a physical layer of mobile terminal 120*a* to discard received packets associated with the application. Hence, the received packets may be discarded already at the physical layer of first mobile terminal 120*a*. Also, the application may be required to be able to participate in the process.

At step 230, mobile terminal 120*a* may determine, upon receiving the first sensor data and the second sensor data, whether the second sensor data is a duplicate of the first sensor data. For example, mobile terminal 120*a* may also comprise a processor. The processor may be configured to determine, at step 230, whether the second sensor data is a duplicate of the first sensor data. Duplicates may be identified by comparing the first sensor data to the second sensor data.

First mobile terminal 120*a* may also comprise a buffer for buffering said first sensor data for a period of time and/or a memory for storing said first sensor data for the period of time, possibly for last X seconds. In such a case, first mobile terminal 120*a* may determine at the end of the period of time, whether the second sensor data is a duplicate of the first sensor data, if second sensor data is received within the period of time. That is to say, in some embodiments, first mobile terminal 120*a* may comprise a timer for the period of time. The timer may be started when the first sensor data is received and then the determination whether the second sensor data is a duplicate of the first sensor data may be performed upon expiry of the timer, if said second sensor data was received while the timer was running.

At step 240, first mobile terminal 120*a* may transmit, responsive to the determination, third sensor data to server 150. That is to say, first mobile terminal 120*a* may transmit third sensor data responsive to determining whether the second sensor data is a duplicate of the first sensor data. In some embodiments, mobile terminal 120*a* may comprise a cellular transmitter as well. Said cellular transmitter may be configured to transmit using a cellular communication technology, such as LTE or 5G/NR. In general, the cellular transmitter may be configured to operate according to a 3GPP standard. The cellular transmitter of first mobile terminal 120*a* may be configured to transmit, responsive to the determination, said third sensor data to server 150 using the cellular communication technology. Said third sensor data may be based on at least one of said first and second sensor data. Said third sensor data may be transmitted from mobile terminal 120*a* to server 150 via base station 130, and possibly via core network 140.

In some embodiments, mobile terminal 120*a* may determine that the second sensor data is a duplicate of the first sensor data. Responsive to the determination that the second sensor data is a duplicate of the first sensor data, mobile terminal 120*a* may discard said second sensor data. The processor of mobile terminal 120*a* may be configured to determine that the second sensor data is a duplicate of the first sensor data. In addition, the processor of mobile terminal 120*a* may be configured to discard said second sensor data responsive to the determination that the second sensor data is a duplicate of the first sensor data.

Mobile terminal 120*a* may also transmit, responsive to the determination that the second sensor data is a duplicate of the first sensor data, said third sensor data, wherein said third sensor data may comprise said first sensor data and not second sensor data. That is to say, said third sensor data may comprise only first sensor data. In some embodiments, the cellular transmitter of mobile terminal 120*a* may be configured to transmit, responsive to the determination that the second sensor data is a duplicate of the first sensor data, said third sensor data. In other words, only remaining sensor data, i.e., non-duplicate sensor data may be transmitted.

In some embodiments, mobile terminal 120*a* may determine that the second sensor data is not a duplicate of the first sensor data. The processor of mobile terminal 120*a* may be configured to determine that the second sensor data is not a duplicate of the first sensor data. In addition, mobile terminal 120*a* may also transmit, responsive to the determination that the second sensor data is not a duplicate of the first sensor data, said third sensor data, wherein said third sensor data may comprise said first sensor data and second sensor data. In some embodiments, the cellular transmitter of mobile terminal 120*a* may be configured to transmit, responsive to the determination that the second sensor data is not a duplicate of the first sensor data, said third sensor data.

At step 240, server 150 may receive said third sensor data from mobile terminal 120*a*. Server 150 may receive said third sensor data via a base station, and possibly via core network 140 as well. In some embodiments, server 150 may also receive fourth sensor data from mobile terminal 120*b*. Said fourth sensor data may be similar as said third sensor data. That is to say, as mobile terminal 120*b* may operate similarly as mobile terminal 120*a*, mobile terminal 120*b* may have received sensor data from wireless sensor nodes 110*d* and 110*e*, for example. Consequently, mobile terminal 120*b* may have determined whether determined the two received sensor data are duplicates and transmitted fourth sensor data to server 150 responsive to the determination.

In some embodiments, the buffer of first mobile terminal 120*a* may be for buffering unique sensor data for a period of time, possibly for last X seconds. That is to say, only remaining, non-duplicate sensor data may be stored to the buffer upon discarding duplicate sensor data. Thus, if second sensor data is discarded, only first sensor data may be stored to the buffer. Moreover, the cellular transmitter of first mobile terminal 120*a* may be further configured to transmit oldest, unique sensor data to the server.

In general, a system may comprise multiple mobile terminals and each of said multiple mobile terminals may determine, or detect, duplicates of sensor data. Moreover, each of said multiple mobile terminals may also discard said duplicates of sensor data and transmit remaining, non-duplicate sensor data to server 150 using cellular communications.

Server 150 may comprise a receiver for receiving third and/or fourth sensor data. The receiver may be configured to receive said third and/or fourth sensor data via base station 130, and possibly via core network 140. In some embodiments, the receiver of server 150 may be configured to receive said third and/or fourth sensor data via a wire-line connection.

Server 150 may determine, at step 250, whether the fourth sensor data is a duplicate of the third sensor data. Duplicates may be identified by comparing the third sensor data to the fourth sensor data. Server 150 may comprise a processor and the processor may be configured to perform the determination. Said processed sensor data may be based on at least one of said third and fourth sensor data That is to say, server 150 may generate processed sensor data based on at least one of said third and fourth sensor data. In some embodiments, the processor of server 150 may generate said processed sensor data. For example, server 150 may generate said processed sensor data to provide a complete view of the movement of all of the ice hockey players during a game and some statistics related to the game.

At step 260, server 150 may transmit, responsive to the determination, said processed sensor data to first mobile terminal 120*a*. Said processed sensor data may be transmitted responsive to receiving said third sensor data from first mobile terminal 120*a* and/or said fourth sensor data from second mobile terminal 120*b*. Said processed sensor data may be associated with the sports event, and possibly associated with said third and/or fourth sensor data as well. In some embodiments, said processed sensor data may be encrypted by server 150 and only mobile terminals that participate in the process may be informed about a security that is required for decrypting the encrypted processed sensor data. Hence, only the participating mobile terminals may decrypt the processed sensor data.

Server 150 may comprise a transmitter and the transmitter may be configured to transmit, at step 260, said processed sensor data to first mobile terminal 120*a*. The transmitter may be configured to transmit said processed sensor data via base station 130, and possibly via core network 140, to first mobile terminal 120*a*. In some embodiments, the transmitter of server 150 may be configured to transmit said processed sensor data via a wire-line connection.

If server 150 receives both, third and fourth sensor data, it may determine whether the fourth sensor data is a duplicate of the third sensor data. The processor of server 150 may perform the determination and generate, responsive to the determination, said processed sensor data.

In some embodiments, server 150 may determine that the fourth sensor data is a duplicate of the third sensor data. Responsive to the determination that the fourth sensor data is a duplicate of the third sensor data, server 150 may discard said fourth sensor data. The processor of server 150 may be configured to determine that the fourth sensor data is a duplicate of the third sensor data. In addition, the processor of server 150 may be configured to discard said fourth sensor data responsive to the determination that the fourth sensor data is a duplicate of the third sensor data. That is to say, server 150, or the processor of server 150, may generate processed sensor data based on said third sensor data and not fourth sensor data.

In general, the processor of server 150 may be configured to discard duplicates of sensor data and to store remaining sensor data to a database and/or process remaining sensor data. That is to say, only the remaining sensor data, i.e., non-duplicate sensor data may be stored and/or processed. In general, remaining, non-duplicate sensor data may therefore refer to unique sensor data.

Server 150 may also transmit, responsive to the determination that the fourth data is a duplicate of the third sensor data, said processed sensor data, wherein said processed sensor data may be based on said third sensor data and not fourth sensor data. That is to say, said processed sensor data may be based only on third sensor data. In some embodiments, the transmitter of server 150 may be configured to transmit, responsive to the determination that the fourth sensor data is a duplicate of the third sensor data, said processed sensor data.

In some embodiments, server 150 may determine that the fourth sensor data is not a duplicate of the third sensor data. The processor of server 150 may be configured to determine that the fourth sensor data is a duplicate of the third sensor data. Server 150, or the processor of server 150, may therefore generate processed sensor data based on said third sensor data and fourth sensor data.

Server 150 may also transmit, responsive to the determination that the fourth data is a not duplicate of the third sensor data, said processed sensor data, wherein said processed sensor data may be based on said third sensor data and fourth sensor data. In some embodiments, the transmitter of server 150 may be configured to transmit, responsive to the determination that the fourth sensor data is not a duplicate of the third sensor data, said processed sensor data.

At step 260, first mobile terminal 120*a* may receive said processed sensor data using cellular communication technology, such as LTE/NR. First mobile terminal 120*a* may comprise a cellular receiver for receiving said processed sensor data. Said processed data may be received from wireless network node 130, possible via core network 140.

At step 270, first mobile terminal 120*a* may exploit said processed sensor data in various ways. For example, a complete view of the movement of all of the ice hockey players during a game and some statistics related to the game may be displayed to a user of first mobile terminal 120*a*, possibly via a user interface of first mobile terminal 120*a*.

In some embodiments, said processed sensor data may be encrypted by server 150 using a security key. Server 150 may, for example, transmit the security key to first mobile terminal 120*a* responsive to receiving said third sensor data. In addition, server 150 may encrypt said processed sensor data using the security key and after that transmit the encrypted processed sensor data to mobile terminal 120*a*. Upon receiving the security key and the encrypted processed sensor data, first mobile terminal 120*a* may decrypt the received processed sensor data using the security. Server 150 may hence control which mobile terminals can decrypt said processed sensor data, thereby giving to a user of first mobile terminal 120*a* a reason, or motivation, for participating in the process. Participation of mobile terminals is needed to be able to reduce resource usage of the cellular communication system, because otherwise wireless sensor network nodes would need to use cellular communications to transmit to base station 130.

Moreover, in some embodiments a security key for first mobile terminal 120*a* may be determined based on third sensor data. For instance, the security key may be based on selecting a certain number of first bits, or last bits, of third sensor data using a predefined rule. Alternatively, or in addition, the security key may be based on multiple, possibly subsequent, transmissions of third sensor data. One or more bits may be selected from the multiple transmissions to be used as the security key.

As an example, if first mobile terminal 120*a* transmits 32 packets comprising sensor data, 8 bits at predefined locations may be selected from each packet, to derive a 256-bit security key. Both, server 150 and first mobile terminal 120*a*, may determine the security key for first mobile terminal 120*a* individually using the predefined rule. Embodiments of the present invention are not limited to the use of any specific predefined rule though. In some embodiments, for example 256 bits associated with one transmission of said third sensor data may be used for deriving the security for first mobile terminal 120*a*.

That is to say, the processor of first mobile terminal 120*a*, and possibly the processor of server 150, may be configured to determine a security key based on said third sensor data. The processor of first mobile terminal 120*a* may also be configured to obtain information using the security key. Said information may be received from server 150. For example, said information may comprise said processed sensor data. In such a case, server 150 may encrypt said processed sensor data using the security key. Respectively, first mobile terminal 120*a* may decrypt said processed sensor data. Thus, server 150 may also control which mobile terminals can decrypt said processed sensor data by using a security key which is derived from sensor data received by server 150.

In some embodiments, first mobile terminal 120*a* may retrieve said information from the Internet using the security key. Server 150 may store said information to another server in the Internet, or server 150 may be accessible via the Internet. Server 150 may hence encrypt said information using the security key and first mobile terminal 120*a* may decrypt said information using the security key.

Figure 3:
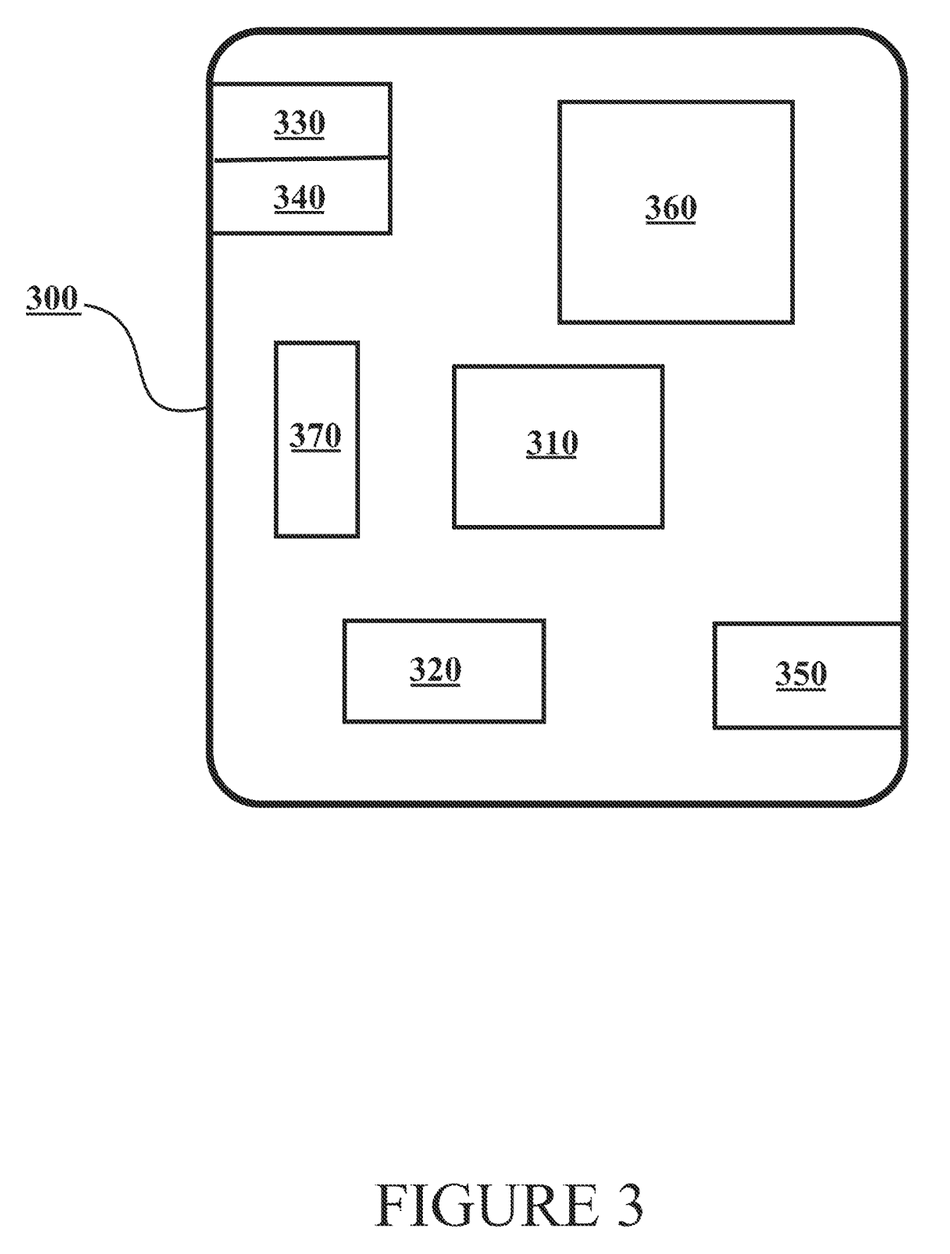
FIG. 3 illustrates an example apparatus capable of supporting at least some embodiments of the present invention.

FIG. 3 illustrates an example apparatus capable of supporting at least some example embodiments. Illustrated is device 300, which may comprise, for example, first mobile terminal 120*a*, or server 150. Comprised in device 300 is processor 310, which may comprise, for example, a single- or multi-core processor wherein a single-core processor comprises one processing core and a multi-core processor comprises more than one processing core. Processor 310 may comprise, in general, a control device. Processor 310 may comprise more than one processor. Processor 310 may be a control device. A processing core may comprise, for example, a Cortex-A8 processing core manufactured by ARM Holdings or a Steamroller processing core produced by Advanced Micro Devices Corporation. Processor 310 may comprise at least one Qualcomm Snapdragon and/or Intel Atom processor. Processor 310 may comprise at least one application-specific integrated circuit, ASIC. Processor 310 may comprise at least one field-programmable gate array, FPGA. Processor 310 may be means for performing method steps in device 300. Processor 310 may be configured, at least in part by computer instructions, to perform actions.

Device 300 may comprise memory 320. Memory 320 may comprise random-access memory and/or permanent memory. Memory 320 may comprise at least one RAM chip. Memory 320 may comprise solid-state, magnetic, optical and/or holographic memory, for example. Memory 320 may be at least in part accessible to processor 310. Memory 320 may be at least in part comprised in processor 310. Memory 320 may be means for storing information. Memory 320 may comprise computer instructions that processor 310 is configured to execute. When computer instructions configured to cause processor 310 to perform certain actions are stored in memory 320, and device 300 overall is configured to run under the direction of processor 310 using computer instructions from memory 320, processor 310 and/or its at least one processing core may be considered to be configured to perform said certain actions. Memory 320 may be at least in part comprised in processor 310. Memory 320 may be at least in part external to device 300 but accessible to device 300.

Device 300 may comprise a transmitter 330. Device 300 may comprise a receiver 340. Transmitter 330 and receiver 340 may be configured to transmit and receive, respectively, information in accordance with at least one cellular or non-cellular communication technology. Transmitter 330 may comprise more than one transmitter. Receiver 340 may comprise more than one receiver. Transmitter 330 and/or receiver 340 may be configured to operate in accordance with Global System for Mobile communication, GSM, Wideband Code Division Multiple Access, WCDMA, 5G, Long Term Evolution, LTE, IS-95, Wireless Local Area Network, WLAN, Ethernet and/or Worldwide Interoperability for Microwave Access, WiMAX, standards, for example.

Device 300 may comprise a Near-Field Communication, NFC, transceiver 350. NFC transceiver 350 may support at least one NFC technology.

Device 300 may comprise User Interface, UI, 360. UI 360 may comprise at least one of a display, a keyboard, a touchscreen, a vibrator arranged to signal to a user by causing device 300 to vibrate, a speaker and a microphone. A user may be able to operate device 300 via UI 360, for example to accept incoming telephone calls, to originate telephone calls or video calls, to browse the Internet, to manage digital files stored in memory 320 or on a cloud accessible via transmitter 330 and receiver 340, or via NFC transceiver 350, and/or to play games.

Device 300 may comprise or be arranged to accept a user identity module 370. User identity module 370 may comprise, for example, a Subscriber Identity Module, SIM, card installable in device 300. A user identity module 370 may comprise information identifying a subscription of a user of device 300. A user identity module 370 may comprise cryptographic information usable to verify the identity of a user of device 300 and/or to facilitate encryption of communicated information and billing of the user of device 300 for communication effected via device 300.

Processor 310 may be furnished with a transmitter arranged to output information from processor 310, via electrical leads internal to device 300, to other devices comprised in device 300. Such a transmitter may comprise a serial bus transmitter arranged to, for example, output information via at least one electrical lead to memory 320 for storage therein. Alternatively to a serial bus, the transmitter may comprise a parallel bus transmitter. Likewise processor 310 may comprise a receiver arranged to receive information in processor 310, via electrical leads internal to device 300, from other devices comprised in device 300. Such a receiver may comprise a serial bus receiver arranged to, for example, receive information via at least one electrical lead from receiver 340 for processing in processor 310. Alternatively to a serial bus, the receiver may comprise a parallel bus receiver.

Figure 5:
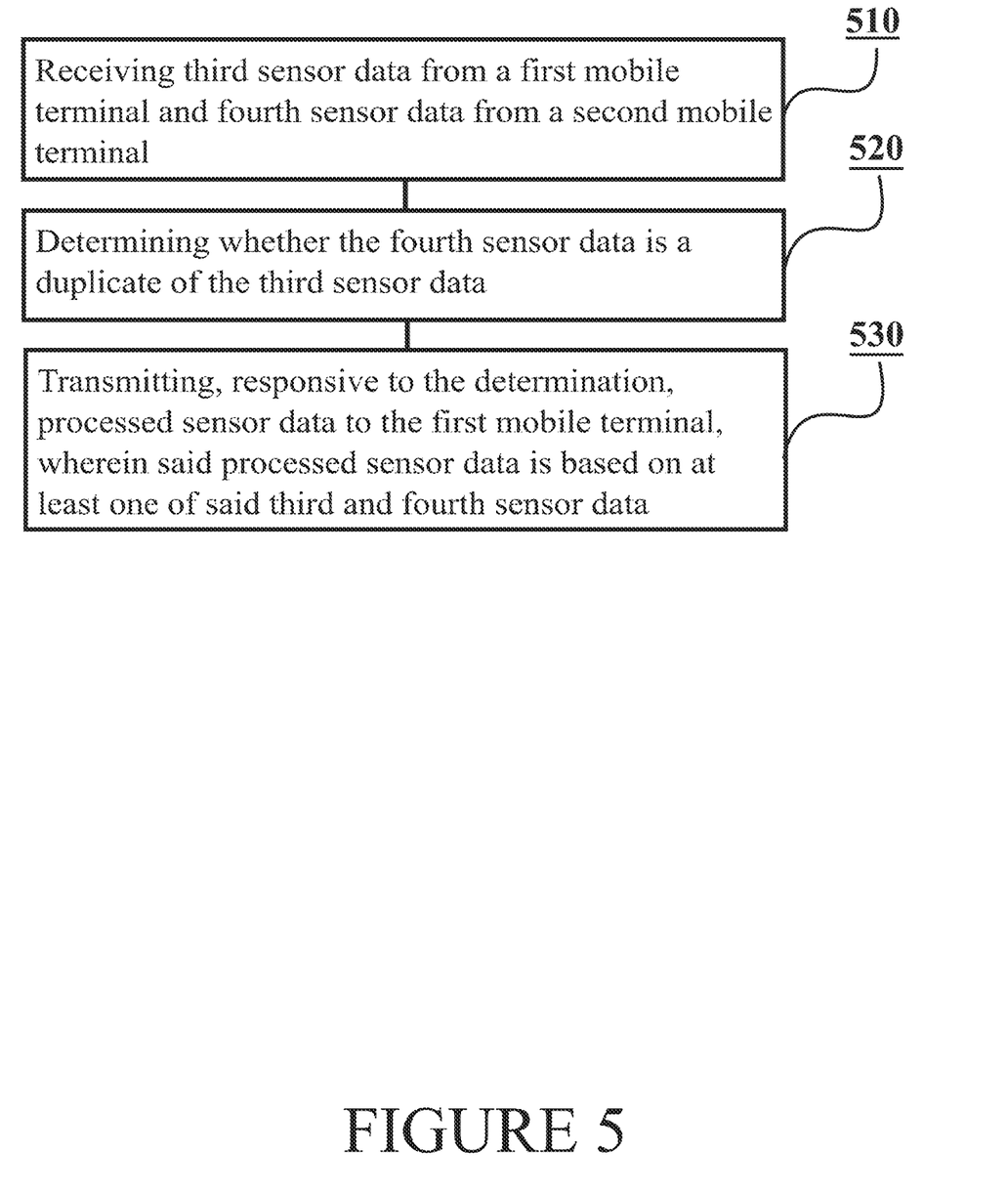
FIG. 5 illustrates a flow graph of a second method in accordance with at least some embodiments of the present invention.

Device 300 may comprise further devices not illustrated in FIG. 5. For example, where device 300 comprises a smartphone, it may comprise at least one digital camera. Some devices 300 may comprise a back-facing camera and a front-facing camera, wherein the back-facing camera may be intended for digital photography and the front-facing camera for video telephony. Device 300 may comprise a fingerprint sensor arranged to authenticate, at least in part, a user of device 300. In some example embodiments, device 300 lacks at least one device described above. For example, some devices 300 may lack a NFC transceiver 350 and/or user identity module 370.

Processor 310, memory 320, transmitter 330, receiver 340, NFC transceiver 350, UI 360 and/or user identity module 370 may be interconnected by electrical leads internal to device 300 in a multitude of different ways. For example, each of the aforementioned devices may be separately connected to a master bus internal to device 300, to allow for the devices to exchange information. However, as the skilled person will appreciate, this is only one example and depending on the example embodiment various ways of interconnecting at least two of the aforementioned devices may be selected without departing from the scope of the example embodiments.

Figure 4:
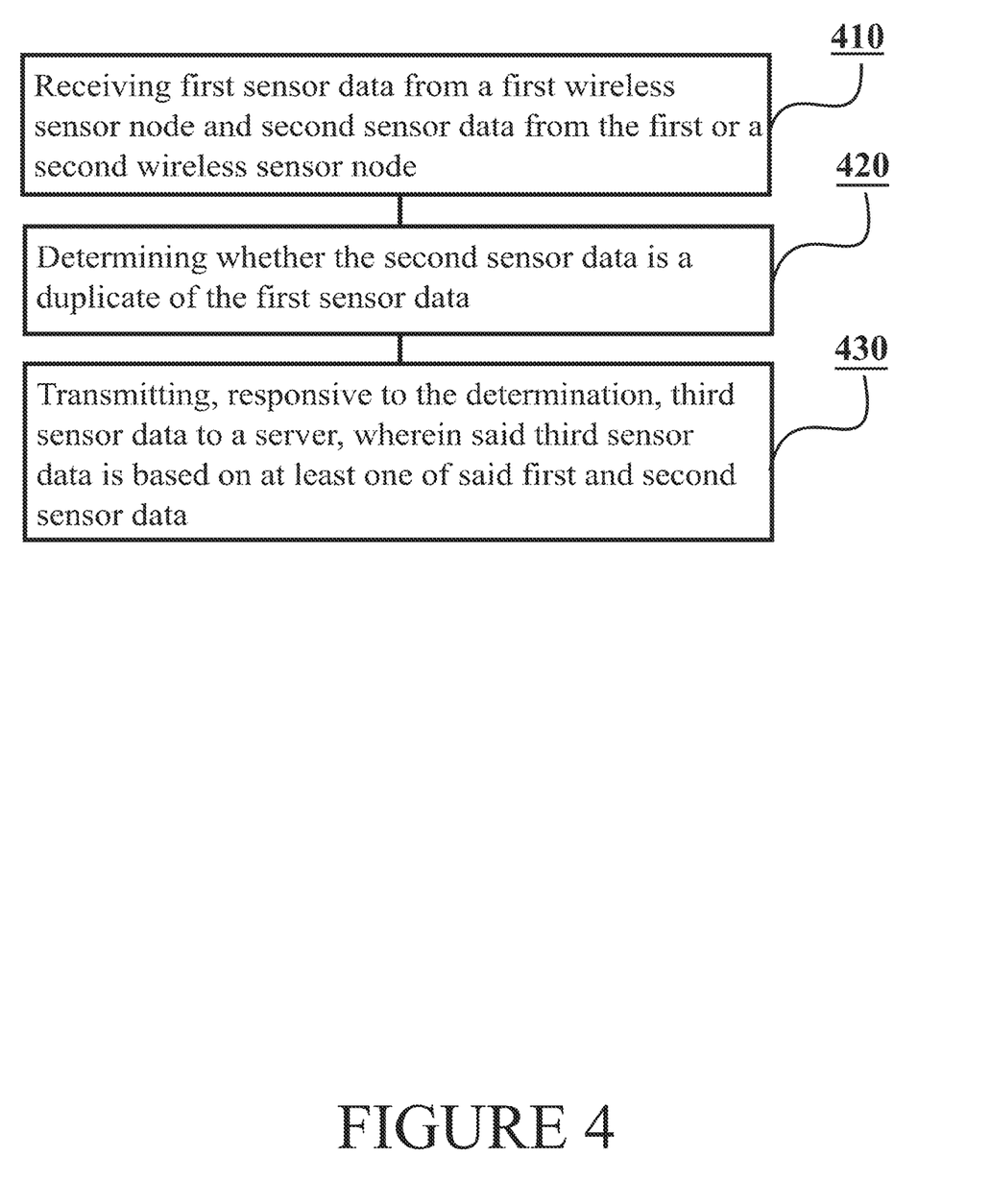
FIG. 4 illustrates a flow graph of a first method in accordance with at least some embodiments of the present invention.

FIG. 4 is a flow graph of a first method in accordance with at least some example embodiments. The phases of the illustrated first method may be performed by first mobile terminal 120a, or a UE in accordance with the 3GPP standards, or by a control device configured to control the functioning thereof, possibly when installed therein.

The first method may comprise, at phase 410, receiving first sensor data from a first wireless sensor node and second sensor data from the first wireless sensor node or a second wireless sensor node. The first method may also comprise, at phase 420, determining whether the second sensor data is a duplicate of the first sensor data. Finally, the first method may comprise, at phase 430, transmitting, responsive to the determination, third sensor data to a server, wherein said third sensor data is based on at least one of said first and second sensor data.

FIG. 5 is a flow graph of a second method in accordance with at least some example embodiments. The phases of the illustrated second method may be performed by server 150, or by a control device configured to control the functioning thereof, possibly when installed therein.

The second method may comprise, at phase 510, receiving third sensor data from a first mobile terminal and fourth sensor data from a second mobile terminal. The second method may also comprise, at phase 520, determining whether the fourth sensor data is a duplicate of the third sensor data. Finally, the second method may comprise, at phase 530, transmitting, responsive to the determination, processed sensor data to the first mobile terminal, wherein said processed sensor data is based on at least one of said third and fourth sensor data.

It is to be understood that the example embodiments disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular example embodiments only and is not intended to be limiting.

Reference throughout this specification to one example embodiment or an example embodiment means that a particular feature, structure, or characteristic described in connection with the example embodiment is included in at least one example embodiment. Thus, appearances of the phrases "in one example embodiment" or "in an example embodiment" in various places throughout this specification are not necessarily all referring to the same example embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various example embodiments and examples may be referred to herein along with alternatives for the various components thereof. It is understood that such example embodiments, examples, and alternatives are not to be construed as de facto equivalents of one another, but are to be considered as separate and autonomous representations.

In an exemplary embodiment, an apparatus, such as, for example first mobile terminal 120a, or server 150, or a control device configured to control the functioning thereof, possibly when installed therein, may comprise means for carrying out the example embodiments described above and any combination thereof.

In an exemplary embodiment, a computer program may be configured to cause a method in accordance with the example embodiments described above and any combination thereof. In an exemplary embodiment, a computer program product, embodied on a non-transitory computer readable medium, may be configured to control a processor to perform a process comprising the example embodiments described above and any combination thereof.

In an exemplary embodiment, an apparatus, such as, for example first mobile terminal 120a, or server 150, or a control device configured to control the functioning thereof, possibly when installed therein, may comprise at least one processor, and at least one memory including computer program code, wherein the at least one memory and the computer program code are configured to, with the at least one processor, cause the apparatus at least to perform the example embodiments described above and any combination thereof.

Furthermore, the described features, structures, or characteristics may be combined in any suitable manner in one or more example embodiments. In the preceding description, numerous specific details are provided, such as examples of lengths, widths, shapes, etc., to provide a thorough understanding of example embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the example embodiments in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some example embodiments find industrial application in wireless communication systems, wherein it is desirable to communicate sensor data efficiently.

ACRONYMS LIST

3GPP $3^{rd}$ Generation Partnership Project
BLE Bluetooth Low Energy
BS Base Station
GSM Global System for Mobile communication IoT Internet of Things
LTE Long-Term Evolution
M2M Machine-to-Machine
MTC Machine-type Communications
NFC Near-Field Communication
NR New Radio
SIM Subscriber Identity Module
UE User Equipment
UI User Interface
USB Universal Serial Bus
WCDMA Wideband Code Division Multiple Access
WiMAX Worldwide Interoperability for Microwave Access
WLAN Wireless Local Area Network

REFERENCE SIGNS LIST

| | |
|---|---|
| 110a, 110b, 110c, 110d, 110e, 110f | Wireless sensor node |
| 120a, 120b | Mobile terminal, e.g., UE |
| 130 | Wireless network node, e.g., BS |
| 140 | Core network |
| 150 | Server |
| 115, 125, 135, 145 | Interfaces |
| 210-270 | Phases of the signaling graph of FIG. 2 |
| 300-370 | Structure of the apparatus of FIG. 3 |
| 410-430 | Phases of the first method of FIG. 4 |
| 510-530 | Phases of the second method of FIG. 5 |

The invention claimed is:

1. A mobile terminal of a spectator of a sports event, comprising:
  a non-cellular receiver configured to receive first sensor data from a first wireless sensor node and second sensor data from the first or a second wireless sensor node;
  a processor configured to determine whether the second sensor data is a duplicate of the first sensor data wherein the first wireless sensor node is a sensor node of a first player in the sports event and the second wireless sensor node is a sensor node of a second player in the sports event; and
  a cellular transmitter configured to transmit, responsive to the determination, third sensor data to a server, wherein said third sensor data is based on at least one of said first and second sensor data, and
  a cellular receiver configured to receive, responsive to transmitting said third sensor data to the server, processed sensor data associated with said third sensor data,
  wherein said processed sensor data are based at least partly on sensor data gathered by a wireless sensor node other than the wireless sensor node(s) upon which said third sensor data is based, and said sensor data are associated with the sports event.

2. The mobile terminal according to claim 1, wherein:
  responsive to the determination that the second sensor data is a duplicate of the first sensor data, the processor is further configured to discard said second sensor data; and
  the cellular transmitter is further configured to transmit said third sensor data, wherein said third sensor data comprises said first sensor data and not second sensor data.

3. The mobile terminal according to claim 1, wherein:
  responsive to the determination that the second sensor data is not a duplicate of the first sensor data, the cellular transmitter is further configured to transmit said third sensor data, wherein said third sensor data comprises the first sensor data and the second sensor data.

4. The mobile terminal according to claim 1, further comprising:
  a buffer for buffering said first sensor data for a period of time; and
  the processor is further configured to determine, at the end of the period of time, whether the second sensor data is a duplicate of the first sensor data.

5. The mobile terminal according to claim 1, further comprising:
  a buffer for buffering unique sensor data for a period of time, possibly for last X seconds; and
  the cellular transmitter is further configured to transmit oldest sensor data to the server.

6. The mobile terminal according to claim 1, wherein:
  the cellular receiver is further configure to receive, responsive to transmitting said third sensor data to the server, a security key from the server; and
  the processor is further configured to decrypt said processed sensor data using the security key.

7. The mobile terminal according to claim 1, wherein:
  the processor is configured to determine a security key based on said third sensor data; and
  the processor is further configured to obtain information using the security key.

8. The mobile terminal according to claim 7, wherein said information is received from the server or said information is retrieved from the Internet.

9. The mobile terminal according to claim 1, wherein the non-cellular receiver is further configured to receive a first broadcast transmission comprising said first sensor data and a second broadcast transmission comprising said second sensor data, wherein said first and second broadcast transmissions comprise advertisement messages.

10. The mobile terminal according to claim 1, wherein said first and second sensor data are associated with a sports application, IoT application or artificial intelligence application.

11. The mobile terminal according to claim 1, wherein said processed sensor data is encrypted using a security key, the mobile terminal configured to decrypt the processed data using said security key.

12. The mobile terminal according to claim 1, wherein the mobile terminal comprises an application for listening to non-cellular transmissions.

13. A system comprising multiple mobile terminals of spectators of a sports event, the mobile terminals comprising:
  a non-cellular receiver configured to receive first sensor data from a first wireless sensor node and second sensor data from the first or a second wireless sensor node, wherein the first wireless sensor node is a sensor node of a first player in the sports event and the second wireless sensor node is a sensor node of a second player in the sports event;
  a processor configured to determine whether the second sensor data is a duplicate of the first sensor data; and
  a cellular transmitter configured to transmit, responsive to the determination, third sensor data to a server, wherein said third sensor data is based on at least one of said first and second sensor data, and
  a cellular receiver configured to receive, responsive to transmitting said third sensor data to the server, processed sensor data associated with said third sensor data wherein said processed sensor data are based at least partly on sensor data gathered by a wireless sensor node other than the wireless sensor node(s) upon which said third sensor data is based, and said sensor data are associated with the sports event.

14. A server, comprising:
a receiver configured to receive third sensor data from a first cellular mobile terminal and fourth sensor data from a second cellular mobile terminal, wherein the first cellular mobile terminal is a mobile terminal of a first spectator in a sports event and the second cellular mobile terminal is a mobile terminal of a second spectator in the sports event, and said third sensor data is from a first wireless sensor node of a first player in the sports event and said fourth sensor data is from a second wireless node of a second player in the sports event;
a processor configured to determine whether the fourth sensor data is a duplicate of the third sensor data; and
a transmitter configured to transmit, responsive to the determination and receiving said third sensor data, processed sensor data to the first cellular mobile terminal, wherein said processed sensor data is based on at least one of said third and fourth sensor data,
wherein said processed sensor data are based at least partly on sensor data gathered by a wireless sensor node other than the wireless sensor node(s) upon which said third sensor data is based, and said sensor data are associated with the sports event.

15. The server according to claim 14, wherein:
responsive to the determination that the fourth sensor data is a duplicate of the third sensor data, the processor is further configured to discard said fourth sensor data; and
the transmitter is further configured to transmit said processed sensor data, wherein said processed sensor data is based on said third sensor data and not fourth sensor data.

16. The server according to claim 14, wherein:
responsive to the determination that the fourth sensor data is not a duplicate of the third sensor data, the transmitter is further configured to transmit said processed sensor data, wherein said processed sensor data is based on said third and fourth sensor data.

17. The server according to claim 14, wherein:
the transmitter is further configure to transmit, responsive to receiving said third sensor data from the first cellular mobile terminal, a security key to the first cellular mobile terminal; and
the processor is further configured to encrypt said processed sensor data using the security key.

18. The server according to claim 14, wherein:
the processor is configured to determine a security key based on said third sensor data; and
the processor is further configured to encrypt said processed sensor data using the security key.

19. The server according to claim 14, wherein said first and second sensor data are associated with a sports application, IoT application or artificial intelligence application.

20. The server according to claim 14, wherein:
the processor is configured to discard duplicates of sensor data received from cellular mobile terminals; and
the processor is configured to store remaining, unique sensor data to a database and/or process remaining, unique sensor data.

* * * * *